US012791869B2

(12) United States Patent
Washio et al.

(10) Patent No.: US 12,791,869 B2
(45) Date of Patent: Nov. 10, 2026

(54) LENS DEVICE

(71) Applicants: Sintai Optical (Shenzhen) Co., Ltd., ShenZhen City (CN); Asia Optical Co., Inc., Taichung (TW)

(72) Inventors: Noriyuki Washio, Taichung (TW); Tomoyoshi Yano, Taichung (TW); Kazutaka Goami, Taichung (TW); Guo-Quan Lin, ShenZhen City (CN)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 615 days.

(21) Appl. No.: 18/359,001

(22) Filed: Jul. 26, 2023

(65) Prior Publication Data

US 2024/0036347 A1 Feb. 1, 2024

(30) Foreign Application Priority Data

Jul. 27, 2022 (CN) ......................... 202210894047.1

(51) Int. Cl.

| | |
|---|---|
| ***G02B 27/64*** | (2006.01) |
| ***G03B 5/00*** | (2021.01) |
| ***G03B 13/36*** | (2021.01) |

(52) U.S. Cl.

CPC ............. *G02B 27/646* (2013.01); *G03B 5/00* (2013.01); *G03B 13/36* (2013.01); *G03B 2205/0007* (2013.01); *G03B 2205/0069* (2013.01)

(58) Field of Classification Search

None

See application file for complete search history.

(56) References Cited

U.S. PATENT DOCUMENTS

| | | | | |
|---|---|---|---|---|
| 2016/0048033 | A1* | 2/2016 | Kim | G02B 7/08 348/357 |
| 2019/0094565 | A1* | 3/2019 | Park | H04N 23/57 |
| 2019/0196137 | A1* | 6/2019 | Ushioda | G03B 13/36 |
| 2020/0150377 | A1 | 5/2020 | Han et al. | |
| 2024/0231120 | A1* | 7/2024 | Park | G02B 27/646 |
| 2025/0076608 | A1* | 3/2025 | Goami | G02B 7/08 |

FOREIGN PATENT DOCUMENTS

| | | | |
|---|---|---|---|
| CN | 105204268 | A | 12/2015 |
| CN | 105446053 | A | 3/2016 |
| CN | 209231588 | U | 8/2019 |
| CN | 110603487 | A | 12/2019 |

(Continued)

*Primary Examiner* — Derek S. Chapel

(74) *Attorney, Agent, or Firm* — McClure, Qualey & Rodack, LLP

(57) ABSTRACT

A lens device includes a base, a lens module, a first carrier, a second carrier and a resilient element. The lens module includes an optical axis extended in a first direction. The first carrier is disposed on the base to carry the lens module. The second carrier is disposed on the base to carry the first carrier. The resilient element is flexible and connects the second carrier and the base. The first carrier is movable with respect to the second carrier in the first direction. The second carrier carrying the first carrier is movable with respect to the base in a second direction and a third direction. The first direction is perpendicular to the second direction and the third direction.

18 Claims, 7 Drawing Sheets

(56) References Cited

FOREIGN PATENT DOCUMENTS

| | | | |
|---|---|---|---|
| CN | 112804418 | A | 5/2021 |
| CN | 215340500 | U | 12/2021 |
| CN | 215729124 | U | 2/2022 |
| JP | 2017003887 | A | 1/2017 |
| KR | 1020180033811 | A | 4/2018 |
| WO | 2017164435 | A1 | 9/2017 |

* cited by examiner

LENS DEVICE

BACKGROUND OF THE INVENTION

Field of the Invention

The invention relates to a lens device.

Description of the Related Art

Many portable electronic devices, such as cell phones, are equipped with lens devices. With the continuously increasing user requirements, it is required that portable electronic devices are able to automatically focus to generate clear images. It is also required that the image blur caused by vibrations can be compensated when the user shoots photographs or a film. However, at present, many portable electronic devices cannot meet the above requirements at the same time, or the structure of the lens device of the portable electronic device is relatively complicated that significantly increases the overall weight of the lens device.

BRIEF SUMMARY OF THE INVENTION

To address the above problems, the invention provides a lens device which can automatically focus and compensate for vibrations and is simple in structure.

The lens device in accordance with an exemplary embodiment of the invention includes a base, a lens module, a first carrier, a second carrier and a resilient element. The lens module includes an optical axis extended in a first direction. The first carrier is disposed on the base to carry the lens module. The second carrier is disposed on the base to carry the first carrier. The resilient element is flexible and connects the second carrier and the base. The first carrier is movable with respect to the second carrier in the first direction. The second carrier carrying the first carrier is movable with respect to the base in a second direction and a third direction. The first direction is perpendicular to the second direction and the third direction.

In another exemplary embodiment, the lens device further includes a flat resilient element configured to constantly apply a resilient force to the first carrier in the first direction towards a photographed object.

In yet another exemplary embodiment, the lens device further includes a first carrier driving device disposed between the first carrier and the second carrier for driving the first carrier to move in the first direction. The first carrier driving device includes a first flexible printed circuit board, a first carrier driving coil and a first carrier driving magnet. The first flexible printed circuit board is disposed to surround an outer circumferential wall of the first carrier. The first carrier driving coil is fixed to the first carrier and is electrically connected to the first flexible printed circuit board. The first carrier driving magnet is disposed on the first carrier or the second carrier and is disposed corresponding to the first carrier driving coil.

In another exemplary embodiment, the lens device further includes a second carrier driving device disposed between the base and the second carrier for driving the second carrier to move in the second direction and the third direction. The second carrier driving device includes a second flexible printed circuit board, a second carrier driving coil and a second carrier driving magnet. The second flexible printed circuit board is disposed to cover over the base. The second carrier driving coil is disposed to cover over the second flexible printed circuit board and is electrically connected to the second flexible printed circuit board. The second carrier driving magnet is disposed on the first carrier or the second carrier and is disposed close to the second carrier driving coil.

In yet another exemplary embodiment, the lens device further includes a guide element disposed between a first groove and a second groove and extended in the first direction. The first groove is formed on an outer surface of the first carrier. The second groove is formed on an inner surface of the second carrier corresponding to the first groove. The guide element is further disposed in the first groove and the second groove.

In another exemplary embodiment, the second groove is L-shaped.

In yet another exemplary embodiment, the guide element is a magnetic element.

In another exemplary embodiment, the first carrier driving magnet and the second carrier driving magnet attract the guide element to generate a pressing force which is applied to the first carrier in a direction perpendicular to the first direction. When the first carrier driving magnet and the second carrier driving magnet are fixed to the first carrier, the guide element is correspondingly fixed to the second carrier.

In yet another exemplary embodiment, the first carrier includes retaining edges disposed at both ends of the first groove to block part of end portions of the guide element.

In another exemplary embodiment, the flat resilient element includes a pressing portion and a fixed portion connected to each other, the fixed portion is connected to the second carrier, the base or the resilient element, and the pressing portion is connected to the first carrier.

In yet another exemplary embodiment, the pressing portions are symmetrically arranged with respect to the optical axis of the lens module.

In another exemplary embodiment, the first carrier includes an end surface disposed distant from the base, and the end surface defines a positioning groove to receive the flat resilient element.

In yet another exemplary embodiment, the lens device further includes another flat resilient element, and the flat resilient elements are connected to four corners of the base, extended in the second direction and in the third direction and connected to a top of the second carrier.

In another exemplary embodiment, the flat resilient element and the guide element are assembled or combined.

In yet another exemplary embodiment, the lens device further includes a connecting element which connects the flat resilient element and the second carrier. The connecting element is extended in a plane perpendicular to the first direction. The connecting element is connected to the fixed portion of the flat resilient element.

In another exemplary embodiment, the base includes a main portion and two lateral portions connected to both sides of the main portion. The main portion defines a light hole. The second flexible printed circuit board is disposed to cover over the base and defines an opening corresponding to the light hole. The base further includes a plurality of electrical terminals electrically connected to the second flexible printed circuit board. The first carrier includes a first side wall, a second side wall, a third side wall and a fourth side wall. The first side wall and the second side wall are arranged opposite to each other in the second direction. The third side wall and the fourth side wall are arranged opposite to each other in the third direction. The second carrier includes a first wall, a second wall, a third wall and a fourth wall. The first wall and the second wall are arranged opposite to each other in the second direction. The third wall and the fourth wall are arranged opposite to each other in the third direction. The first carrier driving coil is externally fixed to the first side wall and the second side wall. The first carrier driving magnet is internally fixed to the first wall and the second wall and is disposed corresponding to the first carrier driving coil. The second carrier driving device includes two groups of second carrier driving magnets, one group is disposed on the first wall and/or the second wall, below the first carrier driving magnet and close to the corresponding second carrier driving coil, and the other group is disposed on the third wall and/or the fourth wall and close to the corresponding second carrier driving coil.

In yet another exemplary embodiment, the lens device further includes a sensor magnet or/and a position control device disposed on the first carrier or the second carrier wherein the flat resilient element is disposed on the first carrier and is electrically connected to the first flexible printed circuit board.

In another exemplary embodiment, the sensor magnet includes a built-in Hall driver or is configured for a position control which is a closed loop control.

In yet another exemplary embodiment, the first carrier driving magnet or the second carrier driving magnet is not only a driving but a sensor magnet for position control for the first carrier or the second carrier.

The invention also provides a camera module which includes the first carrier driving device, the second carrier driving device, a lens module connected to the first carrier driving device and the second carrier driving device, and an image forming unit configured to capture an image of a photographed object formed by the lens module.

DETAILED DESCRIPTION OF THE INVENTION

The purposes, technical solutions and merits of the invention can be more fully understood by reading the subsequent detailed description and embodiments with references made to the accompanying drawings. However, it is understood that the subsequent detailed description and embodiments are only used for explaining the invention. The invention is not limited thereto.

Figure 1:
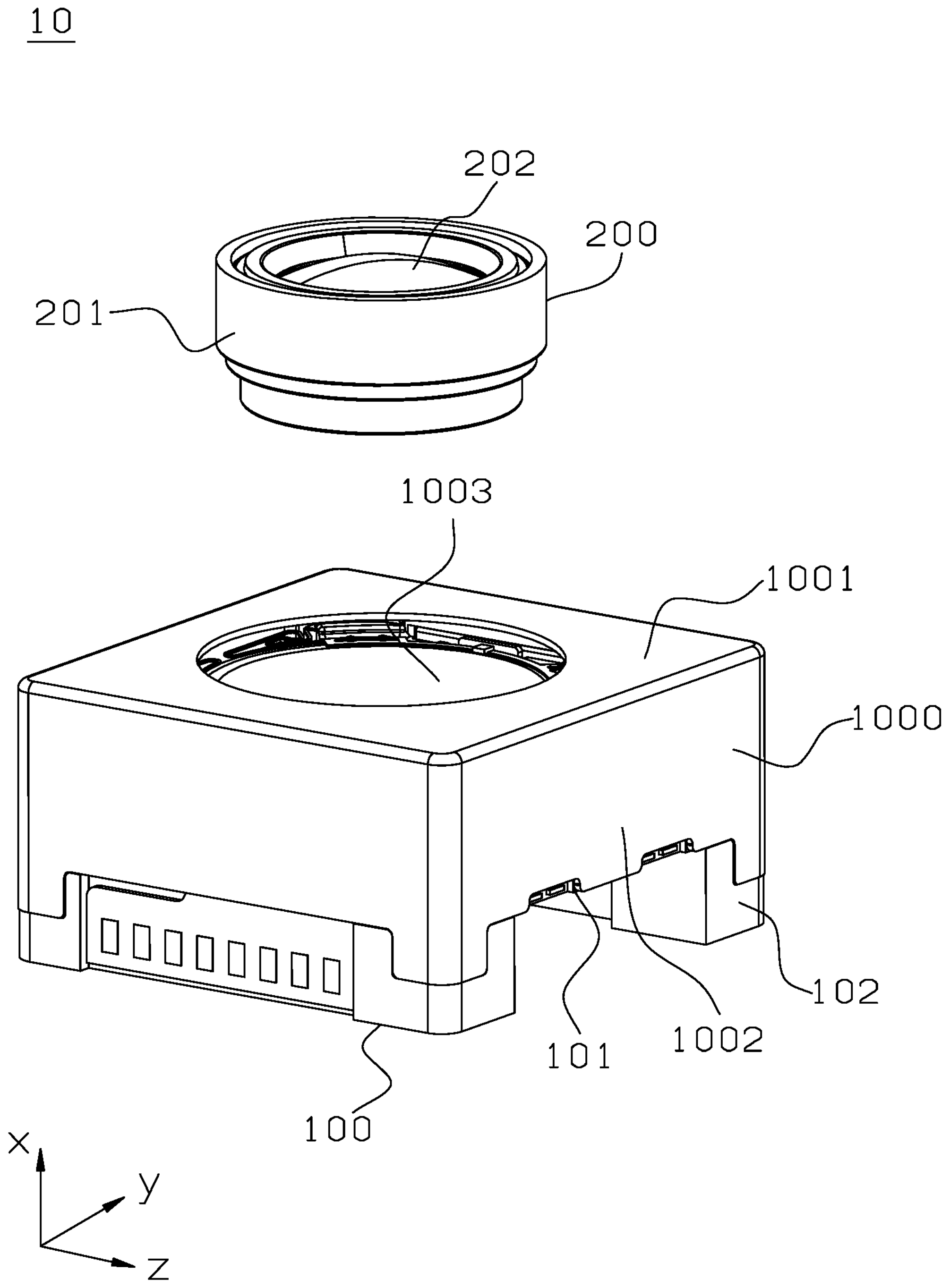
FIG. 1 is a schematic view of a lens device in accordance with an embodiment of the invention.
Figure 2:
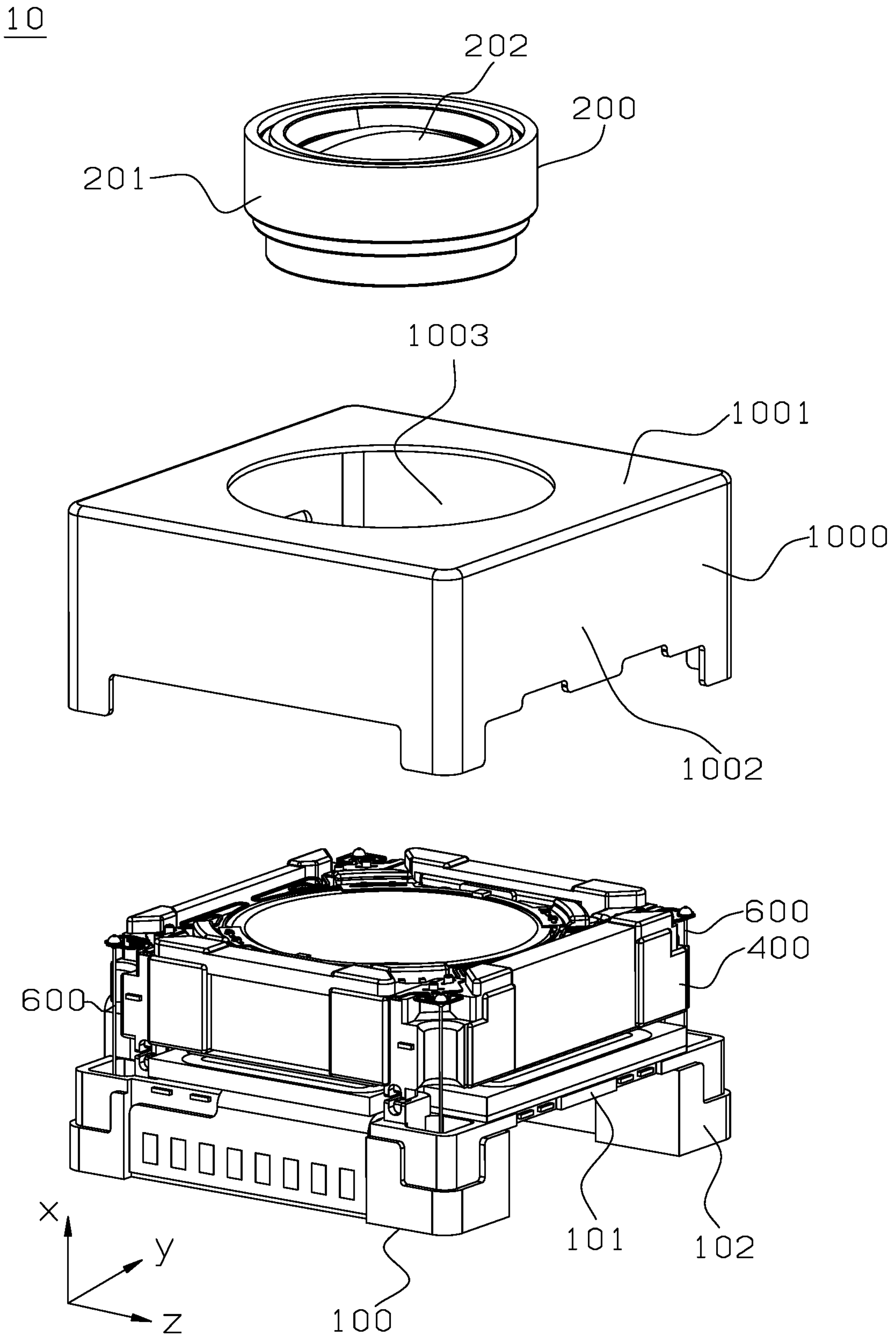
FIG. 2 is a schematic/exploded view of the lens device in accordance with the embodiment of the invention.
Figure 3:
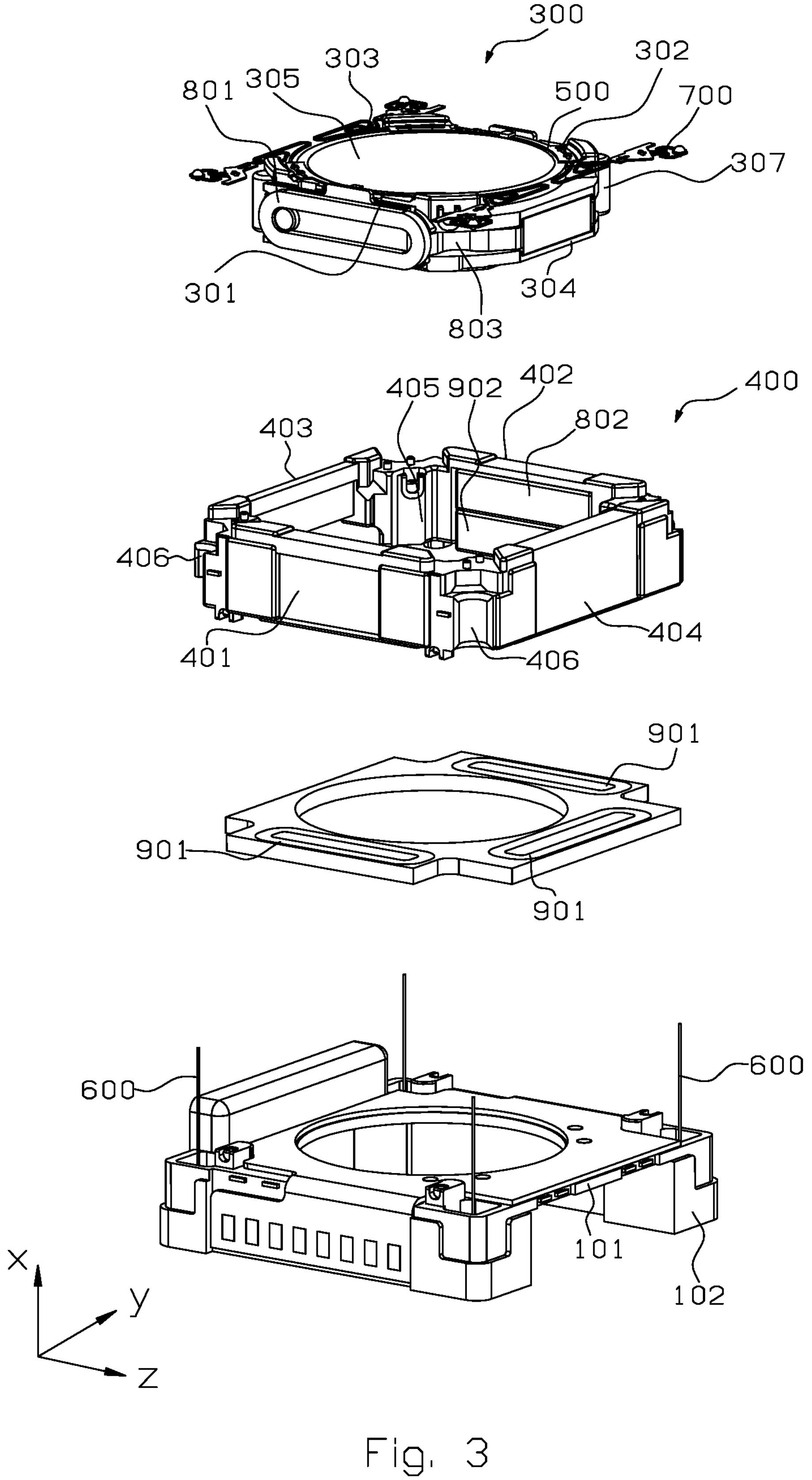
FIG. 3 is a schematic view of some elements of the lens device in accordance with the embodiment of the invention.

FIG. 1 is a schematic view of a lens device in accordance with an embodiment of the invention. FIG. 2 is a schematic/exploded view of the lens device 10 in accordance with the embodiment of the invention. FIG. 3 is a schematic view of some elements of the lens device in accordance with the embodiment of the invention. As shown in FIGS. 1-3, in the embodiment of the invention, the lens device 10 includes a base 100, a lens module 200, a first carrier 300 and a second carrier 400. The lens module 200 has an optical axis extended in a first direction X. The first carrier 300 is disposed on the base 100 to carry the lens module 200 and is movable with respect to the base 100 in the first direction X. The second carrier 400 is connected to the base 100 and is movable with respect to the base 100 in a second direction Y and a third direction Z. The first direction X, the second direction Y and the third direction Z are perpendicular to each other. The first carrier 300 is connected to the second carrier 400 or the base 100 through a flat resilient element 500. In operation, the first carrier 300, under an action of a first carrier driving device, can be moved away from the second carrier 400 with a resilient reaction force constantly applied to the first carrier 300 by the flat resilient element 500. That is, the flat resilient element 500 constantly applies a resilient reaction force to the first carrier 300 in the first direction X (towards a photographed object, not shown). The second carrier 400 is connected to electrical terminals 104 through resilient elements 600 extended in the first direction X wherein the electrical terminals 104 are embedded in the base 100. In operation, the second carrier 400, under an action of a second carrier driving device, can be moved with respect to the base 100 in the second direction Y and the third direction Z. The lens device 100 further includes a cover 1000 which is connected to the base 100.

Referring to FIG. 3, the base 100 includes a main portion 101 and two lateral portions 102 connected to both sides of the main portion 101. A light hole 103 is defined by the base 100.

Referring to FIG. 1, the lens module 200 includes a lens barrel 201, and one or more lenses 200 disposed in the lens barrel 201.

Figure 4:
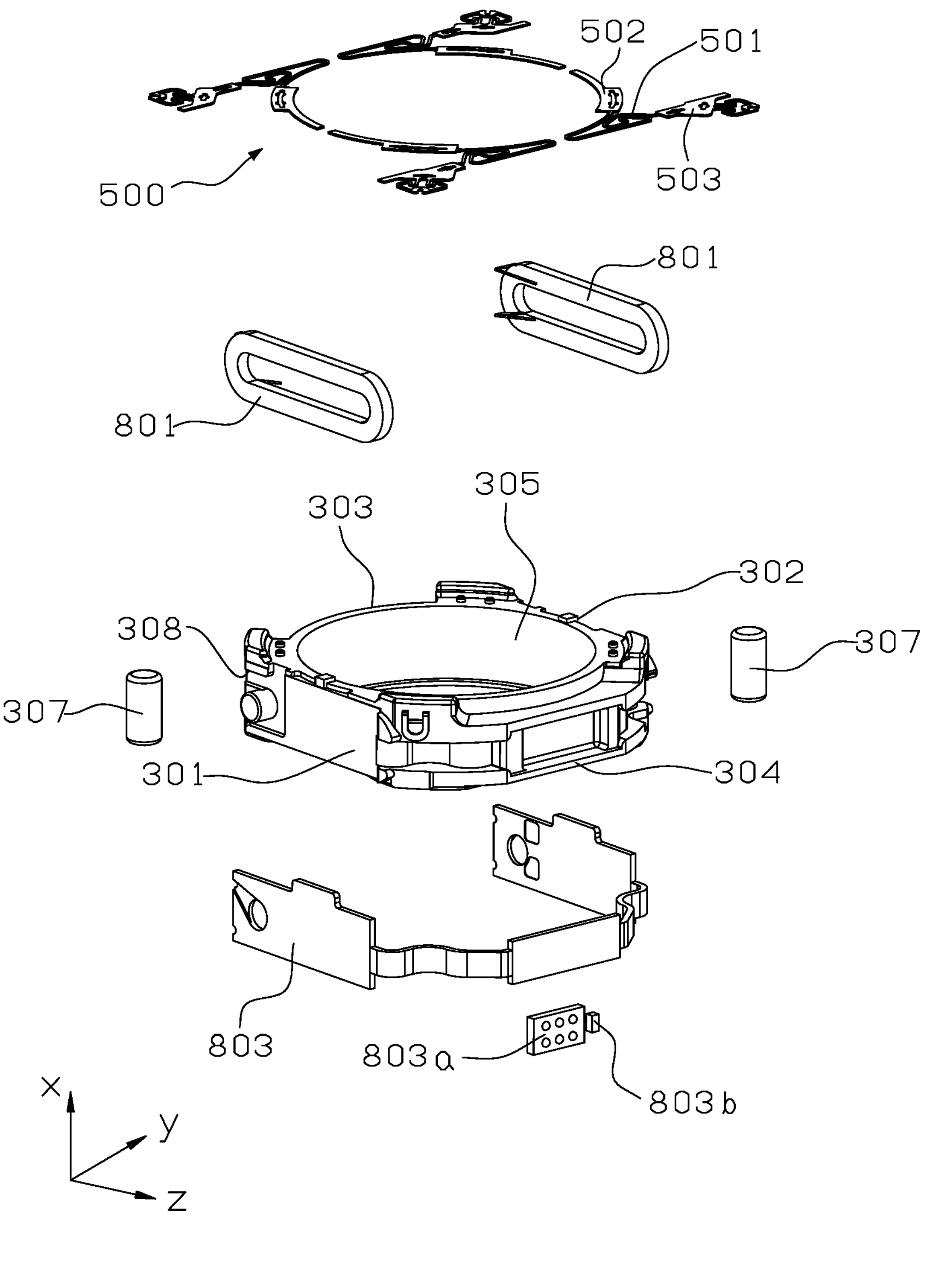
FIG. 4 is a schematic/exploded view of the first carrier and related elements of the lens device in accordance with the embodiment of the invention.
Figure 5:
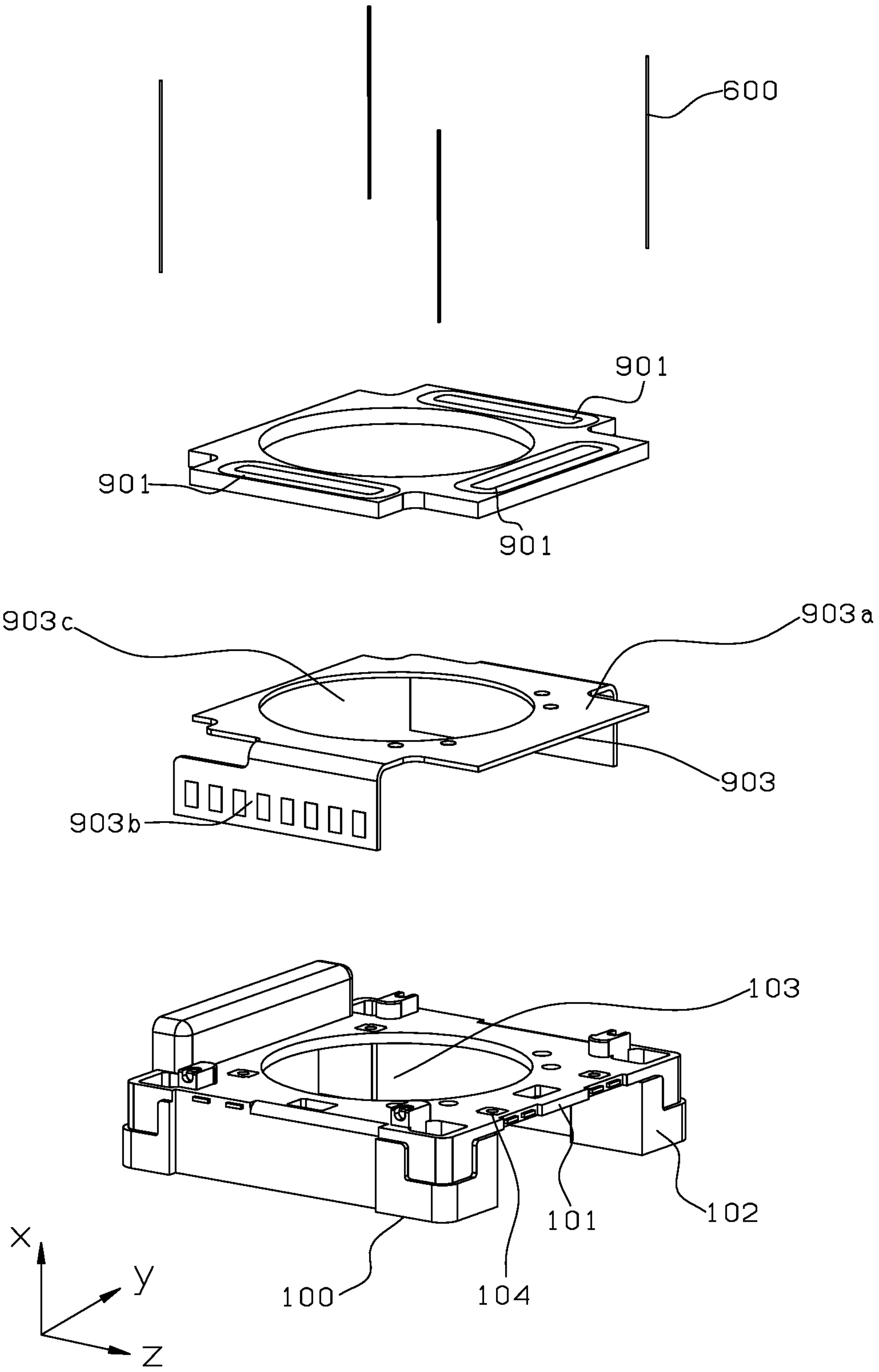
FIG. 5 is a schematic/exploded view of the base and related elements of the lens device in accordance with the embodiment of the invention.
Figure 6:
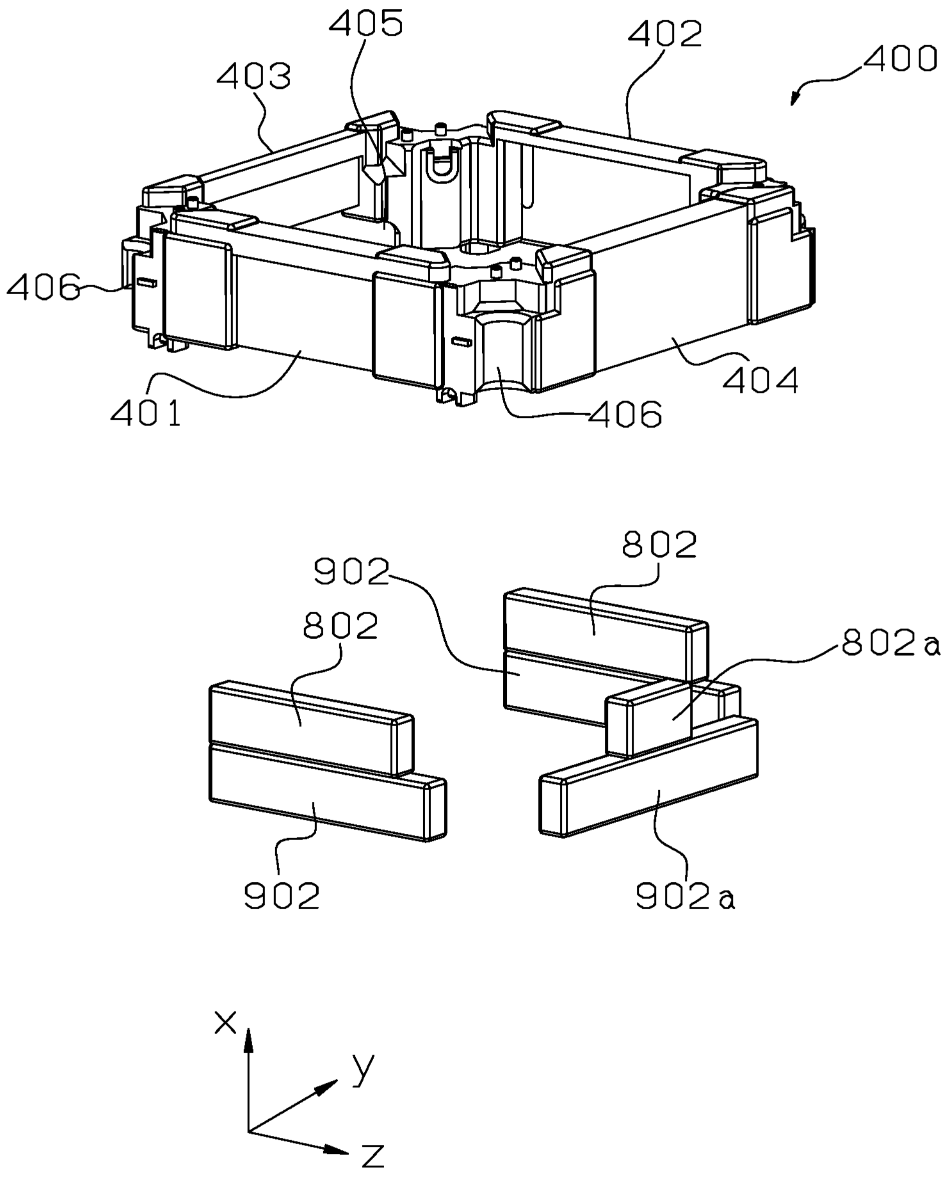
FIG. 6 is a schematic/exploded view of the second carrier and related elements of the lens device in accordance with the embodiment of the invention.
Figure 7:
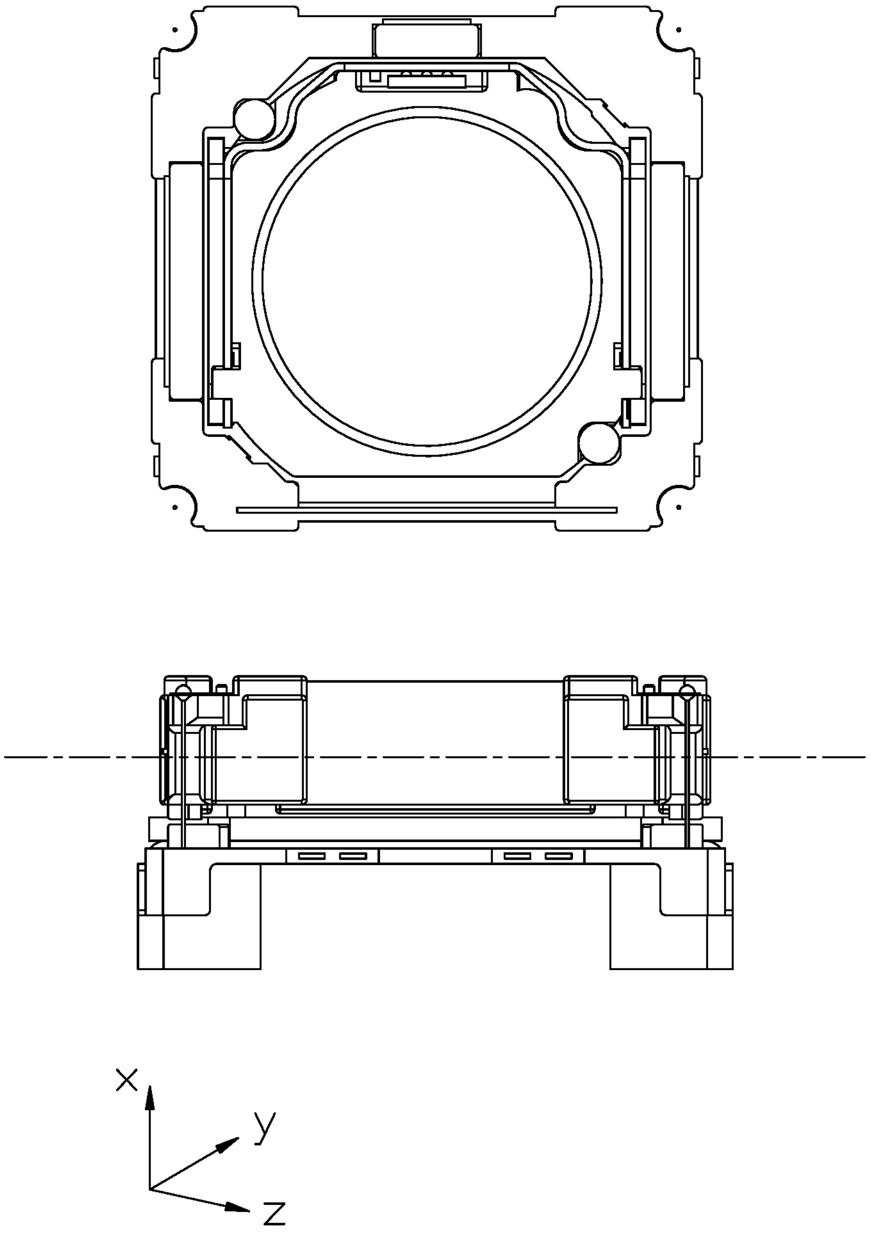
FIG. 7 depicts a section of the first carrier and the second carrier of the lens device in accordance with the embodiment of the invention.

FIG. 4 is a schematic/exploded view of the first carrier and related elements of the lens device in accordance with the embodiment of the invention. FIG. 5 is a schematic/exploded view of the base and related elements of the lens device in accordance with the embodiment of the invention. FIG. 6 is a schematic/exploded view of the second carrier and related elements of the lens device in accordance with the embodiment of the invention. FIG. 7 depicts a section of the first carrier and the second carrier of the lens device in accordance with the embodiment of the invention. As shown in FIGS. 1-7, the first carrier 300 is substantially cylindrical and includes a first side wall 301, a second side wall 302, a third side wall 303 and a fourth side wall 304 wherein the first side wall 301 and the second side wall 302 are arranged opposite to each other in the second direction Y, the third side wall 303 and the fourth side wall 304 are arranged opposite to each other in the third direction Z, and any two adjacent side walls are connected by a transitional surface. However, the invention is not limited thereto. The first carrier 300 is provided with a containing hole 305 for containing the lens module 200. The lens module 200 is fixed to the interior of the containing hole by gluing or interference fitting or in other ways. The dimensions of the light hole 103 of the base 100 is less than the external dimensions of the first carrier 300 to prevent the first carrier 300 from passing through the light hole 103. Further, the dimensions of the light hole 103 are equal to or greater than the external dimensions of the lens 202. Accordingly, light can pass through the lens 202 without being blocked.

The first carrier driving device includes a first carrier driving coil 801 and a first carrier driving magnet 802. The first carrier driving coil 801 is disposed on one of the first carrier 300 and the second carrier 400, and the first carrier driving magnet 802 is disposed on the other of the first carrier 300 and the second carrier 400. In other words, the first carrier driving magnet 802 may be disposed on the first carrier 300 or the second carrier 400. In the embodiment depicted by the drawings, the first carrier driving coil 801 is disposed on the first carrier 300. A first flexible printed circuit board 803 is disposed on the first carrier 300. Specifically, the first flexible printed circuit board 803 is configured to surround the outer circumferential wall of the first carrier 300. The first carrier driving coil 801 is connected to the first flexible printed circuit board 803 and is externally fixed to the first side wall 301 and the second side wall 302. A Hall driver integrated circuit 803*a* and a capacitor 803*b* are disposed on the first flexible printed circuit board 803 corresponding to the fourth side wall 304 of the first carrier 300.

A first groove is formed on the outer surface of the first carrier 300 and a second groove is correspondingly formed on the inner surface of the second carrier. The second groove is L-shaped. A guide element 307 is disposed between the first carrier 300 and the second carrier 400 and is extended in the first direction X. Specifically, the guide element 307 is disposed in the first groove and the second groove. The first carrier 300 further includes retaining edges 308 which are formed corresponding to the guide element 307 and are disposed at both ends of the first groove. The guide element 307 has ends, part of which is blocked by the retaining edges 308 so that the guide element 307 cannot be moved with respect to the first carrier 300. By such arrangement, the guide element 307 is firmly disposed in the first groove. Preferably, the guide element 307 is a magnetic element so that the first carrier driving magnet 802 and the second carrier driving magnet 902, disposed on the second carrier 400 and near the guide element 307, can attract the guide element 307. The first carrier driving magnet 802 and the second carrier driving magnet 902 attract the guide element 307 to generate a pressing force which is applied to the first carrier 300 in a direction perpendicular to the movement direction (i.e. the first direction X). When power is off, the guide element 307 can be kept in position in the optical axial direction by the attraction forces between the guide element 307 and the first carrier driving magnet 802 and between the guide element 307 and the second carrier driving magnet 902. Therefore, the energy consumption can be significantly reduced, and the gap between the first carrier 300 and the second carrier 400 arising from providing the guide element can be eliminated, thereby avoiding the negative influence of the gap on the manufacturing precision. Below the optical axis, there is also attraction between the guide element 307 and the first carrier driving magnet 802 and between the guide element 307 and the second carrier driving magnet 902, to attract the first carrier 300 towards a side of the base 100. When the first carrier 300 is linearly moved with respect to the second carrier 400 in the first direction X, the movement is not affected by any gaps between elements arising from manufacturing tolerance. Therefore, precise and stable linear movement for the auto focus operation can be achieved.

The first carrier 300 has an end surface distant from the base 100, with a plurality of positioning posts provided thereon wherein each position post has a positioning groove for receiving and fixing the flat resilient element 500. The number of the flat resilient element 500 may be plural. The flat resilient element 500 has a movable side and a fixed side. The first carrier 300 disposed at the movable side of the flat resilient element 500 and the second carrier 400 disposed at the fixed side of the flat resilient element 500 have a height difference. That is, the surface of the first carrier 300 disposed towards the photographed object and the surface of the second carrier 400 disposed towards the photographed object are on different levels. The second carrier 400 disposed at the fixed side of the flat resilient element 500 is higher than the first carrier 300 disposed at the movable side of the flat resilient element 500. Therefore, the flat resilient element 500 is configured to pull the first carrier 300 upwards along the optical axis, namely the flat resilient element 500 is configured to apply a resilient force in the first direction X towards the photographed object. The flat resilient element 500 constantly applies a resilient force to the first carrier 300 in the first direction X towards the photographed object. In the embodiment depicted by the drawings, the flat resilient element 500 includes a wrist portion 501, a pressing portion 502 and a fixed portion 503 connected to each other. Specifically, the pressing portion 502 is a movable-side connecting portion and the fixed portion 503 is a fixed-side connecting portion. The pressing portion 502 is disposed at an end of the wrist portion 501 and is connected to the first carrier 300. The fixed portion 503 is disposed at another end of the wrist portion 501 and is connected to the second carrier 400 or the base 100 or the resilient element 600. In order to ensure that the first carrier 300 is kept in position in the second direction Y and the third direction Z, a nonmagnetic guide element 307 may be used together with the flat resilient element 500.

The pressing portion 502 may be arc-shaped and disposed to surround the containing hole 305. One or more flat resilient elements 500 are provided to have the pressing portions 502 and the wrist portions 501 disposed in a symmetrical arrangement with respect to the axis of the light hole 103 and the optical axis of the lens module 200, thereby ensuring equilibrium of forces. By such arrangement, the first carrier 300 can be stably kept in position under the attraction force of the guide element 307 and the pulling force of the flat resilient element 500, even if the power supplied to the lens device 10 is off. The flat resilient element 500 and the guide element 307 may be assembled or combined to increase the pressing force and the pulling force.

FIG. 6 is a schematic/exploded view of the second carrier and related elements of the lens device in accordance with the embodiment of the invention. As shown in FIGS. 2, 3, 6 and 7, the second carrier 400 is a frame and includes a first wall 401, a second wall 402, a third wall 403 and a fourth wall 404 wherein the first wall 401 and the second wall 402 are arranged opposite to each other in the second direction Y, the third wall 403 and the fourth wall 404 are arranged opposite to each other in the third direction Z, and any two adjacent surfaces of the first, second, third and fourth walls 401-404 are connected by a transitional surface. However, the invention is not limited thereto. The second carrier 400 is provided with a containing space 405 for containing the first carrier 300. The first carrier 300 is disposed in the containing space 405 to be linearly moved with respect to the second carrier 400 in the first direction X by the first carrier driving device, thereby performing the auto focus operation.

The described first grooves of the first carrier 300 may be disposed on two opposite corners of the first carrier 300, and the described second grooves of the second carrier 400 may be correspondingly disposed on two opposite corners of the second carrier 400 and corresponding to the first groove. In other words, the first grooves and the second grooves are disposed corresponding to each other. Such arrangement provides spaces for the first carrier driving device and the second carrier driving device to be disposed in. The adjacent inner surfaces of the second carrier 400 are connected by transitional surfaces, and the L-shaped second grooves are provided on the transitional surfaces. However, the invention is not limited thereto. The first grooves and the L-shaped second grooves may be disposed on four corners or at other locations.

The second carrier 400 is connected to the electrical terminals 104 through the resilient elements 600 wherein the electrical terminals 104 are embedded in the base 100. There are plural resilient elements 600. The resilient elements 600 are flexible and are extended in the first direction X. Each of the resilient elements 600 may be, for example, a resilient wire. Under an external force, the resilient wire cannot be elongated in the first direction X but deflected with respect to an end thereof. When the external force is removed, the resilient wire can be restored. In the embodiment depicted by the drawings, the resilient elements 600 are connected to four corners of the base 100. The second carrier 400 has receding grooves 406 formed on its outer surfaces and in its four corners. The resilient elements 600 are extended to pass through the receding grooves 406 and connected to the top of the second carrier 400. In the embodiment depicted by the drawings, the lens device 10 further includes connecting elements 700 which connect the resilient elements 600 and the second carrier 400. The connecting elements 700 are extended in a plane perpendicular to the first direction X. Each of the connecting elements 700 has a first end connected to the top of the second carrier 400, and a second end on which a hole or an indentation is formed allowing the resilient element 600 to pass through. The first end may be wider than the second end.

The described pressing portion 502 of the flat resilient element 500 is fixedly connected to the connecting element 700. The connecting element 700 is fixedly connected to the resilient element 600. The pressing portion 502, the wrist portion 501 and the fixed portion 503 of the flat resilient element 500 may be integrally formed as a continuous-unity piece. Further, the connecting element 700 and the flat resilient element 500 may be integrally formed as a continuous-unity piece.

The second carrier driving device includes a second carrier driving coil 901 and a second carrier driving magnet 902*a*. The second carrier driving coil 901 is disposed on one of the second carrier 400 and the base 100, and the second carrier driving magnet 902*a* is disposed on the other of the second carrier 400 and the base 100. Alternatively, the second carrier driving magnet 902*a* is disposed on the first carrier 300. In the embodiment depicted by the drawings, the second carrier driving coil 901 is disposed on the base 100, the second carrier driving magnet 902*a* is disposed on the second carrier 400, and the second carrier driving magnets 902, 902*a* can be used together for generating the driving magnetic forces to drive the first carrier 300 and the second carrier 400.

Referring to FIGS. 3 and 5, a second flexible printed circuit board 903 is disposed on the base 100. Specifically, the second flexible printed circuit board 903 is laid to cover over the base 100. Further, the second flexible printed circuit board 903 includes a first portion 903*a* and a second portion 903*b*. The first portion 903*a* is laid to cover over the main portion 101 of the base 100. The second portion 903*b* is laid to cover over the two lateral portions 102 of the base 100 and is connected to the first portion 903*a*. The first portion 903*a* and the second portion 903*b* are integrally formed as a continuous-unitary piece. The first portion 903*a* defines an opening 903*c* which is disposed corresponding to the light hole 103. Therefore, light can pass therethrough without be blocked.

A plurality of electrical terminals 104 are provided on the base 100 and are electrically connected to the second flexible printed circuit board 903. Specifically, the electrical terminals 104 are extended from the interior of the two lateral portions 102 of the base 100 to the top surface of the main portion 101 to form the above-described connection. The second carrier driving coils 901 are made in form of a flexible printed circuit board which is placed to cover over the second flexible printed circuit board 903, with the second carrier driving coils 901 electrically connected to the second flexible printed circuit board 903. There may be two groups of second carrier driving coils 901, one group is disposed close to the first wall 401 and/or the second wall 402, and the other group is disposed close to the third wall 403 and/or the fourth wall 404.

The first carrier driving magnets 802 and the second carrier driving magnets 902 of the first carrier driving device are disposed on the inner surfaces of the first wall 401 and the second wall 402 and are disposed corresponding to the first carrier driving coils 801. There are two groups of second carrier driving magnets 902, one group is disposed on the first wall 401 and/or the second wall 402, below the first carrier driving magnets 802, and close to the corresponding second carrier driving coils 901, and the other group is disposed on the third wall 403 and/or the fourth wall 404, and close to the corresponding second carrier driving coils 901. The second carrier driving coils 901 and the second carrier driving magnets 902 are configured to drive the second carrier 400 to move in the second direction Y and the third direction Z. With movement of the second carrier 400, the first carrier 300 which carries the lens module 200 is moved in the second direction Y and the third direction Z to compensate for the vibrations. It can ensure that the formed images are clear.

A Hall driver integrated circuit 803*a*, a sensor magnet or/and a position control device are install on the first flexible printed circuit board 803 to sense the magnetic flux of the second carrier driving magnet 902*a* and the first carrier driving magnet 802*a*, namely to sense the position of the first carrier 300 or/and the position of the second carrier 400. The sensor magnet is a sensor for a position control or has a built-in Hall driver (in a modified embodiment, the second carrier driving magnet 902*a* or the first carrier driving magnet 802*a* is not only a driving magnet but a sensor magnet for position control for the first carrier 300 or the second carrier 400). The sensor magnet may be disposed on the base 100 or the second carrier 400 for a position control (a closed loop control) because the base 100 and the second carrier 400 are disposed more stably than other elements in the lens device 100. The flat resilient element 500 disposed on the first carrier 300 is electrically connected to the first flexible printed circuit board 803.

The cover 1000 includes a top wall 1001 and four outer side walls 1002 connected to the top wall 1001. The top wall 1001 defines a light hole 1003. The cover 1000 is connected to the base 100 for containing other elements.

The lens device 100 is able to perform autofocus operation, compensates for vibrations and is simple in structure.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens device, comprising:

a base;

a lens module comprising an optical axis extended in a first direction;

a first carrier disposed on the base to carry the lens module;

a second carrier disposed on the base to carry the first carrier;

a resilient element which is flexible and connects the second carrier and the base;

a guide element disposed between a first groove and a second groove and extended in the first direction;

wherein the first carrier is movable with respect to the second carrier in the first direction;

wherein the second carrier carrying the first carrier is movable with respect to the base in a second direction and a third direction;

wherein the first direction is perpendicular to the second direction and the third direction;

wherein the first groove is formed on an outer surface of the first carrier, the second groove is formed on an inner surface of the second carrier corresponding to the first groove, and the guide element is a magnetic element and is further disposed in the first groove and the second groove.

2. The lens device as claimed in claim 1, further comprising:

a flat resilient element configured to constantly apply a resilient force to the first carrier in the first direction towards a photographed object.

3. The lens device as claimed in claim 2, wherein the flat resilient element comprises a pressing portion and a fixed portion connected to each other, the fixed portion is connected to the second carrier, the base or the resilient element, and the pressing portion is connected to the first carrier.

4. The lens device as claimed in claim 3, wherein the pressing portions are symmetrically arranged with respect to the optical axis of the lens module.

5. The lens device as claimed in claim 3, further comprising a connecting element which connects the flat resilient element and the second carrier;

wherein the connecting element is extended in a plane perpendicular to the first direction;

wherein the connecting element is connected to the fixed portion of the flat resilient element.

6. The lens device as claimed in claim 2, wherein the first carrier comprises an end surface disposed distant from the base, and the end surface defines a positioning groove to receive the flat resilient element.

7. The lens device as claimed in claim 2, wherein the flat resilient element is connected to four corners of the base, extended in the second direction and in the third direction, and connected to a top of the second carrier.

8. The lens device as claimed in claim 2, wherein the flat resilient element and the guide element are assembled or combined.

9. The lens device as claimed in claim 1, wherein the second groove is L-shaped.

10. The lens device as claimed in claim 1, wherein the first carrier comprises retaining edges disposed at both ends of the first groove to block part of end portions of the guide element.

11. A lens device comprising:

a base;

a lens module comprising an optical axis extended in a first direction;

a first carrier disposed on the base to carry the lens module;

a second carrier disposed on the base to carry the first carrier;

a resilient element which is flexible and connects the second carrier and the base;

a first carrier driving device disposed between the first carrier and the second carrier for driving the first carrier to move in the first direction;

wherein the first carrier is movable with respect to the second carrier in the first direction;

wherein the second carrier carrying the first carrier is movable with respect to the base in a second direction and a third direction;

wherein the first direction is perpendicular to the second direction and the third direction;

wherein the first carrier driving device comprises a first flexible printed circuit board, a first carrier driving coil and a first carrier driving magnet;

wherein the first flexible printed circuit board is disposed to surround an outer circumferential wall of the first carrier;

wherein the first carrier driving coil is disposed on one of the first carrier and the second carrier and is electrically connected to the first flexible printed circuit board for receiving a drive current from the first flexible printed circuit board so that the first carrier driving device can drive the first carrier to move in the first direction;

wherein the first carrier driving magnet is disposed on the other of the first carrier and the second carrier and is disposed corresponding to the first carrier driving coil.

12. The lens device as claimed in claim 11, further comprising:

a second carrier driving device disposed between the base and the second carrier for driving the second carrier to move in the second direction and the third direction;

wherein the second carrier driving device comprises a second flexible printed circuit board, a second carrier driving coil and a second carrier driving magnet;

wherein the second flexible printed circuit board is disposed to cover over the base;

wherein the second carrier driving coil is disposed on one of the second carrier and the base to cover over the second flexible printed circuit board and is electrically connected to the second flexible printed circuit board;

wherein the second carrier driving magnet is disposed on the other of the second carrier and the base and is disposed corresponding to the second carrier driving coil.

13. The lens device as claimed in claim 12, further comprising a guide element disposed between a first groove and a second groove and extended in the first direction, wherein:

the first groove is formed on an outer surface of the first carrier, the second groove is formed on an inner surface of the second carrier corresponding to the first groove;

the first carrier driving magnet and the second carrier driving magnet attract the guide element to generate a pressing force which is applied to the first carrier in a direction perpendicular to the first direction;

when the first carrier driving magnet and the second carrier driving magnet are fixed to the first carrier, the guide element is correspondingly fixed to the second carrier.

14. The lens device as claimed in claim 12, further comprising:

a flat resilient element;

a sensor magnet or/and a position control device disposed on the first carrier or the second carrier wherein the flat resilient element is disposed on the first carrier and is electrically connected to the first flexible printed circuit board.

15. The lens device as claimed in claim 14, wherein the sensor magnet comprises a built-in Hall driver or is configured for a position control which is a closed loop control.

16. The lens device as claimed in claim 12, wherein the first carrier driving magnet or the second carrier driving magnet is not only a driving but a sensor magnet for position control for the first carrier or the second carrier.

17. A camera module, comprising:

the lens device as claimed in claim 12; and an image forming unit;

wherein the lens module is connected to the first carrier driving device and the second carrier driving device;

wherein the image forming unit is configured to capture an image of a photographed object formed by the lens module.

18. A lens device comprising:

a base;

a lens module comprising an optical axis extended in a first direction;

a first carrier disposed on the base to carry the lens module;

a second carrier disposed on the base to carry the first carrier;

a resilient element which is flexible and connects the second carrier and the base;

a first carrier driving device configured to drive the first carrier to move in the first direction, comprising a first carrier driving coil and a first carrier driving magnet;

a second carrier driving device configured to drive the second carrier to move in a second direction, comprising a second flexible printed circuit board, a second carrier driving coil and a second carrier driving magnet;

wherein the first carrier is movable with respect to the second carrier in the first direction;

wherein the second carrier carrying the first carrier is movable with respect to the base in the second direction and a third direction;

wherein the first direction is perpendicular to the second direction and the third direction;

wherein the base comprises a main portion and two lateral portions connected to both sides of the main portion;

wherein the main portion defines a light hole;

wherein the second flexible printed circuit board is disposed to cover over the base and defines an opening corresponding to the light hole;

wherein the base further comprises a plurality of electrical terminals electrically connected to the second flexible printed circuit board;

wherein the first carrier comprises a first side wall, a second side wall, a third side wall and a fourth side wall, the first side wall and the second side wall are arranged opposite to each other in the second direction, and the third side wall and the fourth side wall are arranged opposite to each other in the third direction;

wherein the second carrier comprises a first wall, a second wall, a third wall and a fourth wall, the first wall and the second wall are arranged opposite to each other in the second direction, and the third wall and the fourth wall are arranged opposite to each other in the third direction;

wherein the first carrier driving coil is externally fixed to the first side wall and the second side wall;

wherein the first carrier driving magnet is internally fixed to the first wall and the second wall and is disposed corresponding to the first carrier driving coil;

wherein the second carrier driving device comprises two groups of second carrier driving magnets, one group is disposed on the first wall and/or the second wall, below the first carrier driving magnet and corresponding to the second carrier driving coil, and the other group is disposed on the third wall and/or the fourth wall and corresponding to the second carrier driving coil.

* * * * *